Jan. 9, 1940. T. W. JOHNSON Re. 21,317

CULTIVATOR

Original Filed June 17, 1932

INVENTOR.
Theodore W. Johnson
BY Brown, Jackson, Boettcher & Dienner.
ATTORNEYS.

Reissued Jan. 9, 1940

Re. 21,317

UNITED STATES PATENT OFFICE 21,317

CULTIVATOR

Theodore W. Johnson, Moline, Ill., assignor to Deere & Company, Moline, Ill., a corporation of Illinois Original No. 1,946,403, dated February 6, 1934, Serial No. 617,710, June 17, 1932. Reissue No. 19,762, dated November 19, 1935, Serial No. 738,329, August 3, 1934. This application for reissue November 13, 1939, Serial No. 304,195

33 Claims. (Cl. 97—47)

The present invention relates to cultivators, and more particularly has to do with the shovel carrying rigs and the means for mounting said rigs on the implement frame.

It has been found in the use of cultivators that in order to secure the best performance and a steady operation of the cultivator shovels carried by the rigs the rear shovel should operate slightly deeper than the front shovel during the cultivating operation, regardless of the depth of cultivation for which said rigs are set. It is also desirable that as each rig rises and falls in following the contour of the ground over which it is operating that this same relationship of the several shovels of the rig be maintained; i. e., the rig moving substantially parallel to itself within the range of its vertical movement when in working position in the ground with each of the shovels of the rig operating at the same relative depth at all times. When the implement is operating under load, that is, with the rigs in operating position in the ground, all slack in the connections between the rig and the implement frame is taken up due to the resistance encountered in moving the shovels through the ground. The slack present in the various connections permits the rig itself to rotate slightly in a counterclockwise direction as shown in the accompanying drawing, and furthermore, all strains in the members themselves tend to permit a slight counterclockwise movement of the rig. For this reason it is desirable that the rig itself, when under no strain such as that imposed during the cultivating operation, be carried on the frame by its supporting linkage in a downwardly and rearwardly inclined position, such inclination being sufficient so that when all the slack in the connections is taken up and the beam is straightened by the load, the shovels of the rig will be positioned with the rear shovel slightly lower than the front shovel. It is also desirable that when the rigs are in their lifted or non-working position that the rear shovels thereof be carried at least as high, or even slightly higher, than the front shovels.

With the foregoing in view, therefore, my invention has for its principal object to provide improved means for connecting the shovel carrying rigs with the draft member of the implement frame whereby all of the above noted desirable advantages will be attained.

A further object of the invention is to provide improved means for securing the gauge wheel to the rig beam.

A still further object of the invention is to provide improved means for adjusting the inclination or angular position of the longitudinally extending rig beam relative to its supporting linkage to compensate for variations which may occur in the several parts in the manufacture thereof.

Figure 1:
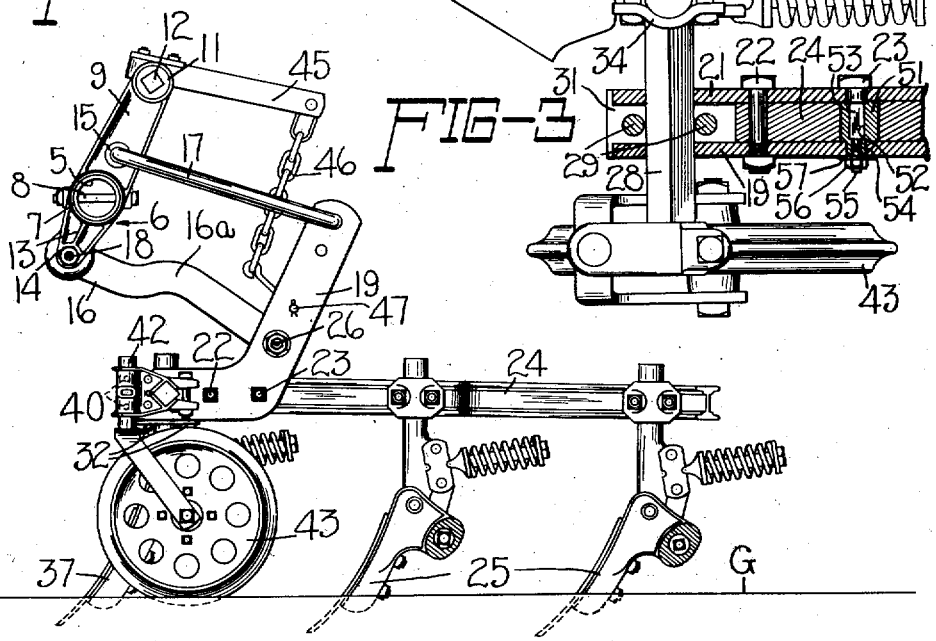
Figure 3:
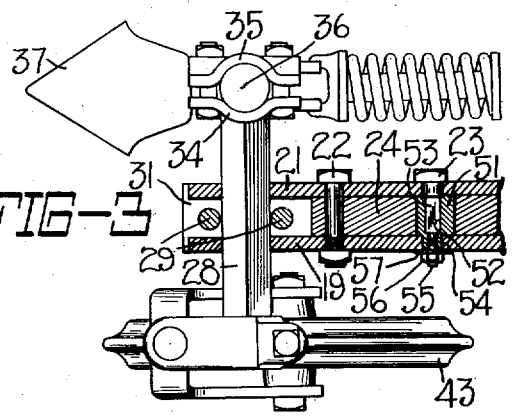
Figure 2:
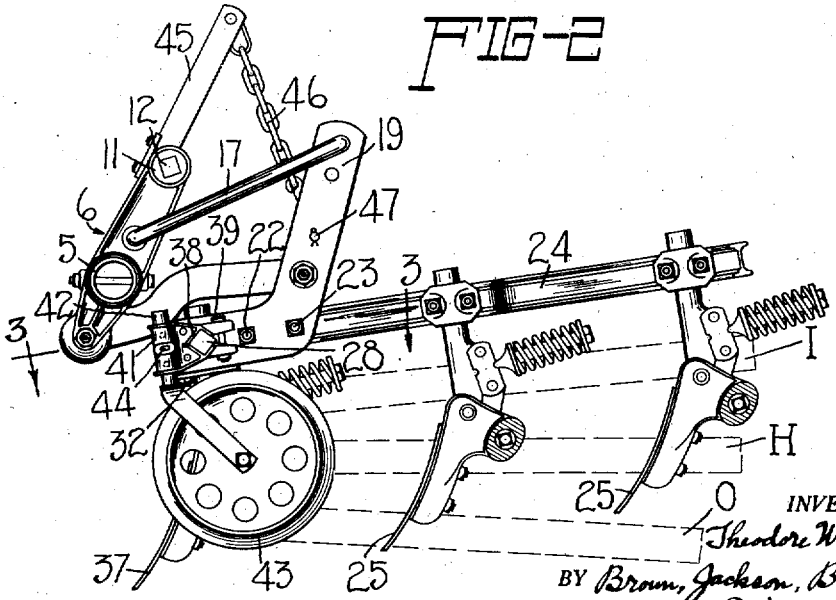

Other objects and advantageous features will be apparent from the following description of the preferred structural embodiment of my invention taken in connection with the accompanying drawing, in which:

Figure 1 is a side view of a cultivator rig and its connections with the implement draft member and lifting rock shaft, and illustrating the rig with its shovels in cultivating position below the ground surface;

Figure 2 is a similar view illustrating the rig in raised or transport position, and also illustrating in dotted lines the angular positions assumed by the longitudinally extending beam of the rig which carries the earth working shovels relative to the horizontal when in its lowermost and uppermost working positions in the ground and when partly raised to transport position; and Figure 3 is a horizontal sectional view taken on the line 3—3 of Figure 2 showing the front shovel of the rig and the gauge wheel in plan, and illustrating the means for securing the proper angular adjustment of the rig beam relative to its supporting means.

The present invention has to do only with my improved cultivator rig and the means for supporting it from the implement, but such other parts as are necessary to a complete understanding of the present invention have been illustrated and will be described herein. The transversely extending draft member or bar which, in the ordinary form of cultivator, is adapted to support a plurality of cultivator rigs, is shown in end elevation and indicated by the numeral 5. A suitable casting 6 provided with a sleeve portion 7 engaging over said draft member and secured thereto by a bolt 8 extending transversely through the sleeve and draft member supports the rig from said draft member as will be hereinafter described.

An arm 9 projects upwardly and rearwardly from each sleeve 7 and has a bearing boss 11 formed at its upper end. Rotatably mounted in the bearing boss 11 is a square rock shaft 12, by the operation of which rock shaft the rig is raised and lowered as will be hereinafter described. The sleeve 7 is also provided with a downwardly and forwardly extending arm 13 positioned in alignment with the arm 9 as shown, which arm 13 is provided with a bifurcated bearing portion 14 at its lower end. The arm 9 is also provided with a second bearing portion 15 positioned intermediate the bearing boss 11 and the sleeve 7. These two bearing portions 14 and 15 of each sleeve member pivotally support the forward ends of two vertically spaced links 16 and 17 disposed in a substantially longitudinal vertical plane and which support the lower portion of the cultivator rig.

The upper link 17 has its forward end bent laterally to pass through the bearing 15, such bent end receiving a cotter pin or any other suitable retaining device on the opposite side of the bearing, as will be readily understood. The forward end of the lower link 16 is pivotally mounted between the bifurcated ends of the bearing portion 14 by a pivot bolt 18, and this end of the link is formed with a flattened portion of considerable area contacting with the flat surfaces of the bifurcated portions 14, whereby side play of the link 16 is substantially eliminated and the rig is accurately held in the desired plane or line of travel. This sleeve construction and the manner of connecting the forward ends of the links 16 and 17 to the sleeve is similar to that shown and described in my prior Patent No. 1,958,625, issued May 15, 1934.

In the present construction I have provided improved means for supporting the various shovel beams and gauge wheel of the rig on the rear ends of the links 16 and 17, such means comprising a pair of substantially L-shaped parallel plates 19 and 21 having their base portions secured together by means of bolts 22 and 23 extending through aligned openings therein, said plates being held in suitable spaced relation to each other, as best shown in Figure 3, by the forward end of a longitudinally extending shovel supporting member in the form of a beam 24 also provided with aligned openings therein for receiving the bolts 22 and 23, whereby the beam is supported from said plates. As shown, the beam 24 is provided with a pair of earth working shovels 25. When the rearwardly extending shovel beam 24 is not used, as is sometimes desirable as shown for instance in my prior Patent No. 1,946,402, issued February 6, 1934, suitable spacing sleeves (not shown) are mounted on the bolts 22 and 23 between the plates 19 and 21 to hold said plates in proper spaced relation to each other. While it is old to provide vertically spaced links such as links similar to those indicated at 16 and 17 for supporting the lower portion of the cultivator rig from the implement draft bar, it has been found that by suitably positioning the pivotal connections of such links with the plates 19 and 21 as illustrated in Figures 1 and 2 of the drawing the above mentioned advantageous features, namely, the rear shovel of the rig operating slightly deeper than the front shovel thereof when the rig is in working position, the rig moving substantially parallel to itself in all operating positions of the rig, and the rear shovel of the rig being elevated higher than the front shovel thereof when the rig is raised to inoperative or non-working position, are attained. The links 16 and 17 are of substantially equal length and diverge slightly toward their rear ends which are pivotally connected with the upwardly extending arms of the plates 19 and 21 on pivot centers spaced farther apart than the pivot centers of the forward ends of said links as will now be described. The rear end of the lower link 16 is journaled between said plates 19 and 21 on a pivot bolt 26 while the rear end of the upper link 17 is bent laterally, such lateral bent portion extending through aligned openings provided therefor in the vertically extending arms of the plates 19 and 21 and being secured in position therein by means of a cotter pin or other suitable retaining device on the opposite side of the plate 21, as will be readily understood.

The base portions or longitudinally extending arms of the L-shaped plates 19 and 21 are provided adjacent their forward ends with square aligned perforations for receiving a square tool shank or cross arm 28 that extends transversely of the implement and is held rigidly in any transverse position of adjustment in said plates by means of a U-bolt 29 positioned between the plates 19 and 21, as shown in Figure 3. The lower ends of said U-bolt 29 pass through aligned holes in a plate 31 extending across and bearing against the two lower edges of the plates 19 and 21 and nuts 32 (see Figure 1) are provided on the threaded ends of said U-bolt below said plate 31 whereby by tightening the nuts 32 the tool shank 28 is rigidly secured in position in said plates as will be readily understood. This clamping mechanism for the transverse tool shank is similar to that described in my prior Patent No. 1,946,402, above referred to.

The lower link 16 is also shown as curved upwardly about midway between its ends, as indicated at 16a in Figure 1, such curvature being provided for the purpose of securing a higher lift of the earth working shovels of the rig in the raising operation before interference is encountered by such links striking the top of the U-bolt 29, as will be readily understood. One end of the tool shank or cross arm 28, as shown at the top in Figure 3, is shaped to provide one element 34 of a clamping device between which and the other element 35 of the clamping device a shank 36 carrying the front earth working shovel 37 is held.

Clamped on the opposite end of the square cross arm 28 on the other side of the plates 19 and 21 from that of the shovel 37 is a suitable casting 38 which is fixedly secured to the cross arm by means of a bolt 39. A vertically extending sleeve 41 is formed in the forward portion of the casting 38 and supports the vertical spindle 42 of a castering gauge wheel 43. The depth at which the shovels of the rig are operated is determined by the particular one of the holes provided in the vertical spindle 42 in which the cotter pin 44 is positioned, as will be readily understood. Such holes are illustrated in dotted lines in Figure 1 and indicated by the numeral 40.

The rig is raised and lowered by the turning of the rock shaft 12 which is accomplished by any suitable means not shown, and for this purpose said rock shaft is provided with a rearwardly extending arm 45 secured thereto so as to rock therewith and having secured thereto adjacent its rear end one end of a chain 46, the opposite end of which is secured to the plate 19 as indicated at 47 in Figures 1 and 2.

As it is desirable to provide for adjusting the inclination or angular position of the longitudinally extending shovel beam 24 relative to the implement frame to take care of possible variations occurring in the manufacture of the links 16 and 17 and the plates 19 and 21 and also to take care of wear in the links and associated parts, suitable means has been incorporated in the implement for that purpose. The opening provided in the rig beam 24 for receiving the bolt 23 is made large enough to receive a cylindrical bushing 51 having an off-center bore 52 which is made square in cross section to receive the intermediate portion 53 of the bolt 23 which is likewise of square cross section to fit snugly in the bore of the bushing. A small bushing 54 is provided on the reduced end portion 55 of the bolt to center the bolt in the perforation provided therefor in the plate 19. Such reduced end 55 of the bolt is threaded and is provided with a nut 56 for clamping the parts in position, a washer 57 being interposed between the nut and the plate 19. By loosening the nut 56 and turning the bolt 23 in the proper direction the bushing 51 will turn with the nut thereby causing the beam 24 to rotate a slight amount about the bolt 22, thereby adjusting its angular position relative to the plates 19 and 21 and the implement as a whole, as will be readily understood.

In Figure 1 the rig is shown in lowered or working position and it will be noted that the rear end of the rig is slightly lower than the front end whereby the rearmost shovel 25 of the rig operates slightly deeper than the front shovel 37 thereof, while in Figure 2 the rig is shown in its elevated or inoperative position and it is to be noted that when in such position the rear end of the longitudinally extending beam 24 is carried considerably higher than the front end, whereby the rearmost shovel 25 is elevated considerably higher above the ground surface (indicated in the drawing by the reference letter G) than is the front shovel 37. In Figure 2 is illustrated in dotted lines the various positions assumed by the beam 24 when in working position, and also the position of the beam approximately midway between working position and raised or inoperative position. The dotted line position indicated by the reference letter O is the operating position of the beam when it is following through a low place, while the dotted line position of the beam 24 indicated by the reference letter H represents its position when it is following over a ground surface of higher elevation than the general elevation of the ground on which the tractor or implement wheels are supported. The dotted line positions indicated by the reference letters O and H, therefore, represent the normal range of floating movement that the rig has during operation. It is to be noted that such dotted line positions are substantially parallel with each other. The dotted line position of the beam 24 indicated by the reference letter I shows a position of the beam 24 intermediate the position indicated by the reference letter H and the full lift position of the beam as shown in full lines. It is to be noted that as the beam moves from the position indicated by the reference letter H towards its full lift position the rear end of the beam moves upwardly at a more rapid rate than does its forward end, so that when the beam is in full lifted position the rear shovel of the beam is raised an appreciable extent more than the front shovel thereof above the ground surface.

In the preferred embodiment this advantageous result is secured by disposing the links 16 and 17 so that their pivot points with the arm 13 and plates 19 and 21 form a trapezoid in which the length of the links 16 and 17 are equal but the distance between the front pivots is less than the distance between the rear pivots. In the normal or operating position of the rigs the links 16 and 17 make approximately the same angle with the members 19 and 21. This is the position in which the rig beams move substantially parallel to themselves, but after the beams have been raised a material amount these angles are no longer approximately equal and the rear ends of the beams then are raised at an increasing rate, this increase being proportional to the difference between the angles. In the illustrated embodiment the links are almost but not quite parallel and are so arranged that when the rig is in normal or operating position the links are substantially perpendicular to the plates 19 and 21. Being almost perpendicular, for this position at least, the rig will move substantially parallel to itself for a given range, but after this range has been exceeded the rig beam will be swung through an increasing angular displacement, as illustrated in Figure 2.

While I have shown and described the preferred embodiment of my invention it will be apparent that my invention is not to be limited to the specific means shown and described but that, in fact, widely different means may be used in the practice of the broader aspects of my invention.

What I claim, therefore, and desire to secure by Letters Patent is:

1. An agricultural implement comprising a transversely extending draft bar, an arm fixed to said bar, a cultivator rig, means for raising and lowering said rig, and means separate from said first named means and comprising a pair of non-parallel links, both having free pivotal connection with said arm and the rig for supporting said rig from said draft bar whereby the rear shovel of the rig will operate deeper than the front shovel thereof when in operating position and will be raised higher than said front shovel when the rig is raised to inoperative position.

2. An agricultural implement comprising a transversely extending draft bar, an arm fixed to said bar, a cultivator rig, means supporting said rig from said draft bar, said means comprising a pair of vertically spaced links having free pivotal connection with the rig and with the upper and lower portions of said arm, the points of pivotal connection between the rig and the links being spaced farther apart than the points of pivotal connection between the links and the arm on said raft bar, whereby the rear shovel of the rig will operate deeper than the front shovel thereof when in operating position and will be raised higher than said front shovel when the rig is raised to inoperative position, and means separate from said supporting means for raising and lowering said rig.

3. An agricultural implement comprising a transversely extending draft bar, an arm fixed to said bar, a cultivator rig having shovels, a pair of vertically spaced links pivotally supporting said rig from said arm, the rig being arranged with the rear shovel lower than the front shovel, said links being of equal length and inclining upwardly and converging forwardly when the beam is in operating position, whereby the rear shovel of the rig will be raised higher than said front shovel when the rig is raised to inoperative position, and means supported on said arm separately from said links for raising and lowering said rig.

4. An agricultural implement comprising a transversely extending draft bar, an arm fixed thereto, a cultivator rig, means supporting said rig from said draft bar, said means comprising vertically spaced links of equal length and pivotally connected with the rig and with said arm above and below said draft bar, the points of pivotal connection between the rig and the links being spaced farther apart than the points of pivotal connection between the links and the arm, whereby the rear shovel of the rig will operate deeper than the front shovel thereof when in operating position and will be raised higher than said front shovel when the rig is raised to inoperative position, and means carried by said draft bar and connected with said rig separate from said supporting links for raising and lowering said rig.

5. An agricultural implement comprising a transversely extending draft bar, an arm fixed thereto having a lower bifurcated end, a cultivator rig, means carried by the upper end of said arm for raising and lowering said rig, and means separate from said raising and lowering means and comprising a pair of vertically spaced nonparallel links having free pivotal connection with said arm, one being connected with said bifurcated end while the other link is connected with the upper portion of said arm below said raising and lowering means, said links also having free pivotal connection with said rig for supporting said rig from said arm whereby when the rear shovel of the rib is positioned to operate deeper than the front shovel thereof in working position the shovels will maintain such relationship in all the normal range of floating movement of the rig in operation and the rear shovel will be raised higher than the front shovel when the rig is raised to inoperative position.

6. An agricultural implement comprising a transversely extending draft bar, an arm fixedly secured thereto, a cultivator rig, means carried by said bar for raising and lowering said rig, and means separate from said first named means pivotally supporting said rig from said arm for floating movement, said means comprising a pair of vertically spaced links having free pivotal connection with said arm and with the rig, the points of pivotal connection between the rig and the links being spaced farther apart than the points of pivotal connection between the links and the draft bar, and the rear shovel of the rig being positioned to operate deeper than the front shovel thereof, the angular relation between the links being such that the shovels will maintain such relationship in all normal range of floating movement of the rig in operation and the rear shovel will be raised higher than the front shovel when the rig is raised to inoperative position.

7. An agricultural implement comprising a transversely extending draft bar, an arm fixedly secured to said draft bar and having at its lower end two laterally spaced depending portions, a cultivator rig, said rig including two laterally spaced plate members, means connected with said plate members for raising and lowering said rig, and a pair of vertically spaced links pivotally supporting said rig from said draft bar for free floating movement, the lower of said vertically spaced links being disposed between said depending portions on the arm and between said laterally spaced plate members on the rig, the rear shovel of the ring being arranged to operate deeper than the front shovel thereof when in operating position and said links being arranged substantially perpendicularly with respect to a line joining the points of their connection with the rig when the latter is in operating position but converging forwardly, whereby the rear shovel of the rig will be raised higher than the front shovel when the rig is raised to inoperative position by swinging said links upwardly from their substantially perpendicular position.

8. An agricultural implement comprising a transversely extending draft bar, a cultivator rig including a pair of vertically extending plates and a longitudinally extending rig beam, means connecting said plates together in spaced relation with respect to each other, and means pivotally supporting said rig from said draft bar, said means comprising two vertically spaced links converging forwardly when the rig is in operating position and pivotally connected at their rear ends with said pair of plates, the lower of said links being disposed between said plates while the other link is disposed adjacent one side thereof, said links making substantially equal angles with said plates when the rig is in operating position but having their front ends pivoted at points closer together than their rear ends whereby the rear end of the beam will be raised higher than the front end when the rig is raised to inoperative position, and means disposed alongside the upper of said links and connected with said plates for raising and lowering said rig.

9. A cultivator rig comprising a pair of vertically extending spaced plates, a longitudinally extending tool carrying beam, and means for securing the forward end of said beam between said plates, said means including parts shiftable between the plates operative to adjust said beam angularly relatively to said plates.

10. A cultivator rig comprising a pair of vertically extending spaced plates, a longitudinally extending tool carrying beam disposed between said plates and extending rearwardly therefrom, a pair of bolts connecting said beam with said plates, and means carried by one of said bolts for adjusting said beam angularly relatively to said plates.

11. A cultivator rig comprising a pair of vertically extending spaced plates having aligned openings therein, a longitudinally extending tool carrying beam pivotally supported between said plates and extending rearwardly therefrom, said beam being provided with an opening aligning with openings in said plates, a bolt extending through said aligned openings in the plates and beam for securing said beam in fixed position between said plates, and an eccentric bushing rotatable in the opening in the beam and movable with the bolt whereby by turning said bolt said beam may be adjusted angularly relatively to said supporting plates.

12. A cultivator rig comprising a pair of vertically extending spaced plates, a longitudinally extending tool carrying beam supported at its forward end between said plates and extending rearwardly therefrom, forwardly extending members formed integrally with said plates and having aligned openings therein, a transversely extending cross arm extending through said aligned openings, an earth working tool secured to said arm on one side of said plates, and a gauge wheel secured to said arm on the opposite side of said plates.

13. A cultivator rig comprising a pair of vertically extending spaced plates, a longitudinally extending tool carrying beam supported at its forward end between said plates and extending rearwardly therefrom, forwardly extending members formed integrally with said plates and having aligned openings therein, a transversely extending tool carrying member extending through said aligned openings, means for adjustably securing said member in position in said plates, an earth working tool secured to said member on one side of said plates, and a gauge wheel secured to said member on the opposite side of said plates.

14. A cultivator rig comprising a pair of vertically extending spaced plates, a longitudinally extending tool carrying beam supported at its forward end between said plates and extending rearwardly therefrom, forwardly extending members formed integrally with said plates and having aligned openings therein, a transversely extending tool carrying member extending through said aligned openings, an earth working tool secured to said member on one side of said plates, and a castering gauge wheel secured to said member on the opposite side of said plates.

15. A cultivator rig comprising a supporting member, a transversely extending arm carried by and extending outwardly from opposite sides of said member, an earth working tool supported on one end of said arm, and a gauge wheel supported at the opposite end of said arm.

16. A cultivator rig comprising a supporting member, a transversely extending arm carried by and extending outwardly from opposite sides of said member, an earth working tool supported on one end of said arm, a gauge wheel supported at the opposite end of said arm, and a longitudinally extending tool carrying beam having its forward end secured to said supporting member.

17. A cultivator rig comprising a supporting member, a transversely extending cross arm carried by and extending outwardly from opposite sides of said member, an earth working tool supported on one end of said cross arm, a gauge wheel supported at the opposite end of said cross arm, a longitudinally extending tool carrying beam having its forward end secured to said supporting member, and means for adjusting said beam angularly relatively to said supporting member.

18. A cultivator rig comprising a pair of vertically extending spaced plates, a longitudinally extending tool carrying beam, and means for securing the forward end of said beam between said plates, said means including a rotatable member acting against the beam and reacting against said plates whereby said beam may be adjusted angularly relatively to said plates.

19. A cultivator rig comprising a supporting member, a transversely extending arm carried by and extending outwardly from opposite sides of said member, an earth working tool supported on one end of said arm, a gauge wheel supported at the opposite end of said arm, and means adjustably connecting said arm with said supporting member whereby one adjustment of said arm simultaneously adjusts said tool and said gauge wheel.

20. A cultivator rig comprising a supporting member, a transversely extending arm carried by said member, an earth working tool carried by said arm, a gauge wheel carried by said arm, and means adjustably connecting said arm with said member whereby adjustment of said arm simultaneously adjusts said tool and said gauge wheel.

21. A cultivator rig comprising vertically extending plate means, a longitudinally extending tool carrying beam, means connecting the forward end of said beam with said plate means, and means shiftable with respect to said plate means and operative thereby to adjust said beam relative to said plate means.

22. A cultivator rig comprising a supporting member, a tool carrying part mounted on and extending in opposite directions from its point of connection with said member, an earth-working tool mounted on said part adjacent one end thereof, and gauge means supported on said part adjacent the other end thereof.

23. A cultivator rig comprising a supporting member, a tool carrying part mounted on said member, an earth-working tool carried by said part, gauging means also carried by said part, and means adjustably connecting said part with said member whereby adjustment of said part simultaneously adjusts said tool and said gauging means.

24. A cultivator unit for tractor cultivators comprising a supporting member adapted to be mounted on a tractor, a draft bracket mounted thereon, substantially parallel drag links pivotally connected to the draft bracket at their forward ends in vertically spaced relation, a tool bracket to which the rear ends of said links are pivotally connected, said tool bracket having a socket extending therethrough, a tool bar having its middle portion mounted in said socket for adjustment axially, a ground engaging depth gauge mounted on one end of the tool bar, and a tillage tool mounted on the opposite end of the tool bar.

25. An agricultural implement comprising draft means, a cultivator rig, means for raising and lowering said rig, and means separate from said first-named means and comprising a pair of non-parallel links, both having free pivotal connection with said draft means and with said rig for supporting the latter from said draft means, whereby the rear tool of the rig will operate deeper than the front tool thereof when in operating position and will be raised higher by said raising and lowering means than the front tool when the rig is raised to its inoperative position.

26. An agricultural implement comprising a draft frame, a cultivator rig having tools, a pair of generally vertically spaced links pivotally supporting said rig from said draft frame, the rig being arranged with the rear tool lower than the front tool when in operating position, said links being of substantially equal length and inclining upwardly and converging forwardly when the rig is in its operating position, whereby the rear tool of the rig will be raised higher than the front tool when the rig is raised to its inoperative position, and means carried by said draft frame separately from said links for raising and lowering said rig.

27. A cultivator rig comprising a supporting member having a socket, a tool bar carried in said socket and extending in opposite directions therefrom, an earth-working tool carried by said tool bar on one side of said socket, and gauge means supported by said tool bar on the other side of said socket.

28. A cultivator rig comprising a supporting member having a socket, a tool bar carried by said member and movably disposed in said socket, an earth-working tool carried by said bar, gauging means also carried by said bar, and means adjustably securing said bar in said socket, whereby adjustment of said beam simultaneously adjusts both said tool and said gauging means relative to said supporting member.

29. An agricultural implement comprising a transversely extending draft bar, an arm fixed to said bar, a cultivator rig having front and rear tools, means for raising and lowering said rig, a pair of plates fixed to said rig in spaced apart relation, and means separate from said first named means and comprising a pair of non-parallel links disposed in vertically spaced relation, one end of the lower link being disposed between said spaced apart plates, both of said links having free pivotal connection with said arm and the rig for supporting said rig from said draft bar, whereby the rig is held substantially rigid against lateral deflections, and the rear tool of the rig will operate deeper than the front tool thereof when in operating position and will be raised higher than said front tool when the rig is raised to inoperative position.

30. An agricultural implement comprising a transversely extending draft bar, an arm fixed to said bar and having a lower bifurcated portion, a cultivator rig having front and rear tools, means for raising and lowering said rig, a pair of upwardly extending plates fixed to said rig in spaced apart relation, and means separate from said first named means and comprising a pair of vertically spaced non-parallel links, the upper link having free pivotal connection at its ends with said arm and said rig, the rear end of the lower link being disposed between said spaced plates and the forward end of said lower link being disposed within the bifurcated portion of said arm, whereby the rig is held substantially rigid against lateral deflections, said non-parallel links being arranged whereby the rear tool of the rig will operate deeper than the front tool thereof when in operating position and will be raised higher than said front tool when the rig is raised in inoperative position.

31. An agricultural implement comprising a transversely extending draft bar, an arm fixed thereto and having a lower bifurcated portion, a cultivator rig having front and rear tools, means for raising and lowering said rig, a pair of plates fixed to said rig in spaced apart relation, and means separate from said first named means and comprising a pair of generally vertically spaced links, one end of the lower link being disposed between said spaced plates and the other end being received within the bifurcated portion of said arm, whereby the rig is held substantially rigid against lateral deflections, one end of the upper link being pivotally connected to said arm and the other end being pivoted to at least one of said plates, said links being non-parallel whereby the rear tool of the rig will operate deeper than the front tool thereof when in operating position and will be raised higher than said front tool when the rig is raised to inoperative position.

32. An agricultural implement comprising draft means, a cultivator rig, means for raising and lowering said rig, means pivotally supporting said rig from said draft means, said pivotal supporting means comprising two generally vertically spaced links, both having free pivotal connection with said draft means, a pair of vertically extending plates connected with said rig, the lower of said links being disposed between said plates to hold the rig substantially rigid against lateral deflection while the other link is disposed adjacent one side of one of the plates, said links being arranged in non-parallel relation whereby the rear end of the rig will be raised higher than the front end when the rig is raised to inoperative position and will be disposed lower than the front end when the rig is in operating position.

33. An agricultural implement comprising a draft frame, a cultivator rig having tools, a pair of generally laterally spaced plates fixed to said cultivator rig, an arm having a bifurcated portion forming a part of said draft frame, a pair of generally vertically spaced links pivotally supporting said rig from said draft frame, said lower link comprising a flat bar having one end disposed in the bifurcated portion of said arm and the other end disposed between said laterally spaced plates, the upper link being pivotally connected at its ends to said arm and at least one of said plates and said upper link being disposed alongside said arm and one plate, respectively, the rig being arranged with the rear tool lower than the front tool when in operating position, said links being of substantially equal length and inclining upwardly and converging forwardly when the rig is in its operating position, whereby the rear tool of the rig will be raised higher than the front tool when the rig is raised to its inoperative position, and means carried by said draft frame separately from said links for raising and lowering said rig.

THEODORE W. JOHNSON.